United States Patent Office 2,891,066
Patented June 16, 1959

2,891,066

4,o-SUBSTITUTED PHENYL 1 ALKANOL PIPERIDINES AND ESTERS THEREOF

Robert F. Parcell, St. Clair Shores, Mich., assignor to Parke, Davis & Company, Detroit, Mich., a corporation of Michigan No Drawing. Application August 14, 1957
Serial No. 678,026

7 Claims. (Cl. 260—294.3)

This invention relates to certain piperidine compounds and to methods for obtaining the same. More particularly, the invention relates to 4-phenylpiperidines and acid salts thereof which in free base form may be represented by the formula

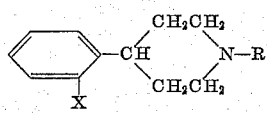

where X represents a chlorine or bromine radical or an alkoxy, alkenyloxy or alkylmercapto group containing from one to three carbon atoms and R represents a hydroxyalkyl group containing two to six carbon atoms or an ester thereof such as a lower aliphatic acyl ester containing not more than four acyl carbon atoms, a carbamic acid ester or an N-alkyl- or N,N-dialkyl-carbamic acid ester in which the N-alkyl group contains one to four carbon atoms.

In accordance with one embodiment of the invention, the products are produced by reducing an β-phenyl-N-substituted glutarimide having the formula

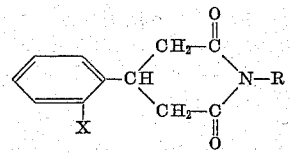

where X and R have the above-mentioned significance. The reduction can be carried out in a number of different ways, preferably by catalytic means employing gaseous hydrogen and a metal catalyst such as copper chromite, or by chemical means employing a complex oxidizable metal hydride such as lithium aluminum hydride. The reduction with gaseous hydrogen and copper chromite catalyst is conveniently carried out in the presence of an inert organic solvent, under elevated hydrogen pressure, preferably in the range from about 200 to 300 atmospheres, and at elevated temperature preferably in the range of about 200 to 300° C. Solvents which can be used for the reaction include lower aliphatic alcohols and cyclic aliphatic ethers, some examples of which are methanol, ethanol, n-propanol, isopropanol, dioxane and the like. In the case of reduction with lithium aluminum hydride an anhydrous non-hydroxylic organic solvent is employed, preferably in the amount of from 1 to 2 liters per mole of hydride. Among the various solvents which are suitable, there may be mentioned diethylether, diisopropylether, dioxane, tetrahydrofuran, and ethylene glycol dimethyl- and diethyl-ethers. Preferably, the hydride is employed in excess of the theoretical amount indicated, and for best results about 3 to 6 equivalents are used; the reaction is favored by combining the reactants slowly. The temperature of reaction is not particularly critical and for most purposes can be varied within the range from 0° C. to the boiling point of the reaction mixture, in the case of ether about 34° C. and tetrahydrofuran, about 66° C.

In another embodiment of the invention, the products are produced by reacting a 4-phenylpiperidine of formula

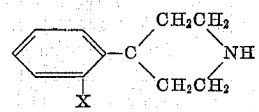

where X has the above-mentioned significance, with a reactive derivative of an omega-hydroxyalkyl compound containing from two to six carbon atoms. In one variation of this embodiment an omega-alkanol halide, sulfate or sulfonate can be employed as the reactive derivative. The reaction is carried out by contacting the reactants, conveniently in the presence of an anhydrous organic solvent. Among the various solvents suitable for the purpose may be mentioned hydrocarbons such as benzene, toluene, xylene and the like; low boiling alcohols such as methanol, isopropanol and the like; and low boiling ketones such as acetone, methyl ethyl ketone and the like. Although the relative proportions of the reactants may be varied, it is preferable to employ about two equivalents of the 4-phenylpiperidine for each equivalent of the mentioned reactive derivative. The temperature of the reaction is not particularly critical. Temperatures in excess of 30° C. up to about 175° C. are preferred. Conveniently, the reaction is carried out at the reflux temperature of the reaction mixture. The reaction can also be carried out employing as the reactive derivative an omega-acyloxyalkyl halide, sulfate or sulfonate containing from two to six alkyl carbon atoms in the manner indicated above, in which case the resulting 4-phenyl-1-acyloxyalkylpiperidine product may, if desired, be subjected to hydrolysis or alcoholysis to the corresponding 4-phenyl-1-(omega-hydroxy)-alkylpiperidine. Hydrolysis can be conveniently carried out with an aqueous alkali metal hydroxide or alkaline earth metal hydroxide in an inert organic solvent such as a lower aliphatic alcohol or ketone. Alcoholysis can be carried out with catalytic amounts of an alkali metal alcoholate in an anhydrous alcohol solvent such as a lower aliphatic alcohol. Alcoholysis or hydrolysis, as the case may be, can be effected over a wide temperature range but is preferably carried out at the boiling point of the reaction mixture. Also, the reaction can be carried out employing as the reactive derivative an omega-halo straight chain aliphatic carboxylic acid esters or omega-carboalkoxy acyl halides, the acyl portion of the reactive derivative containing from two to six carbon atoms, or a lower alkyl ester of acrylic acid. The reaction is carried out in the same manner indicated above and the reaction product is subsequently reduced in accordance with the method set forth above for the reduction of the glutarimide. Likewise, ethylene oxide can be employed as the reactive derivative and the reaction carried out with the 4-phenylpiperidine at tempeartures ranging from 10 to 80° C. thereby leading to the corresponding 4-phenyl-1-(2-hydroxyethyl)piperidine. In accordance with a further embodiment, the 4-phenylpiperidine alkanols of the invention can be converted by acylation to the corresponding alkanol esters, employing as an acylating agent a lower aliphatic carboxylic acid acyl halide or anhydride, a carbamyl ester or halide R'R''=N—COY or an alkyl isocyanate R'NCO, where R' and R'' are alkyl groups containing not more than four carbon atoms, R'' alternatively representing hydrogen, and Y is a halogen radical or a lower alkoxy group. In carrying out the process the proportion of the reactants may be varied considerably, but for maximum yields an excess of the acylating agent is generally employed. The reaction is favored by the use of an inert organic solvent such as benzene, toluene, xylene, chlorobenzene and the like. In a case where acetic anhydride is employed as an acylating agent, acetic acid can be advantageously employed as the solvent. The reaction involving the alkyl isocyanate takes place at room temperature within short periods of time so that it is unnecessary to apply external heat, whereas with the other acylating agents mentioned higher temperatures are ordinarily employed, preferably the reflux temperature of the reaction mixture. Where the reaction is carried out with a carbamyl ester as a starting material, a catalytic amount of a metal alkoxide, preferably aluminum alkoxide such as aluminum isopropoxide, is ordinarily required.

As indicated above the products of the invention occur in both the free base and acid salt forms. In some instances it will be desirable to obtain the acid salt from the free base. In this case the salt can be prepared by reacting the free base with the corresponding acid in the presence of a suitable organic solvent in which the intended salt is insoluble, permitting isolation of the salt by filtration, decantation, or other suitable means. On the other hand in those instances where it is desired to convert the acid salt to the free base, the same can be accomplished by dissolving the salt in a suitable solvent such as water, methanol, etc., neutralizing the solution with a basic material such as sodium hydroxide, ammonium hydroxide, alkali metal carbonate and the like and isolating the desired base by extraction or other suitable means.

The products of the invention possess significant hypotensive and central nervous system depressant activity; consequently, they have application, when administered orally in suitable dosage form, in the treatment of hypertension, hyperexcitability, and similar conditions. In addition, they also possess anti-emetic activity and as such have application in the relief of nausea and vomiting. The dosage ordinarily indicated is about 75 to 800 mg. per day. This dosage is conveniently administered in about 25 to 100 mg. quantities 3 to 6 times a day and the treatment continued as required to relieve the condition under treatment.

The invention is illustrated by the following examples.

*Example 1*

(a) A mixture of 228 g. of o-methoxybenzaldehyde and 436 g. of ethyl acetoacetate is treated at 0° C. with 15 ml. of piperidine, allowed to stand at 0–5° C. for one hour and then at 20–25° C. for 24 hours. 200 ml. of absolute ethanol is added. The reaction mixture is chilled thoroughly and filtered. The precipitate is washed with a 50% dilute alcohol until the yellow color has vanished. This precipitate is partially dried and then added portionwise to a stirred hot solution of 350 g. of potassium hydroxide in 240 ml. of water. The reaction mixture is stirred and maintained at 90–95° C. for 45 minutes, diluted with two volumes of water, washed with ether, acidified slowly with 550 ml. of concentrated hydrochloric acid, chilled thoroughly and filtered. The filter cake is washed several times with ice water and dried in vacuo at 60° C. The product is β-o-methoxyphenylglutaric acid, M.P. 186–190° C. 147 g. of β-o-methoxyphenylglutaric acid is dissolved in 300 ml. of water and 100 ml. of concentrated ammonium hydroxide. The solution is charcoaled and filtered and then heated in an open flask until the temperature of the mixture reaches 200° C. This temperature is maintained for approximately 20 minutes and then cautiously diluted with 200 ml. of absolute alcohol, heated to boiling, diluted with 400 ml. of hot water, stirred, cooled thoroughly and filtered. The filter cake is washed with ice water and dried in vacuo at 60° C. This crude product is β-o-methoxyphenylglutarimide, M.P. 122–125° C. 219 g. of β-o-methoxyphenylglutarimide is dissolved in 700 ml. of anhydrous tetrahydrofuran and slowly added (2.5 hours) to a stirred slurry of 93 g. of lithium aluminum hydride in 3.1 of ether. The reaction mixture is stirred for an additional two hours after the addition and then decomposed with 98 ml. of water, 73 ml. of 20% sodium hydroxide and 318 ml. of water in that order. The reaction mixture is filtered andd the solvent removed by evaporation on a steam bath. The residue is distilled in vacuo to obtain 4-o-methoxyphenylpiperidine, B.P. 115–118° C. at 1.1 mm.

(b) A solution of 16 g. of 4-o-methoxyphenylpiperidine and 10 g. of methyl acrylate in 50 ml. of absolute ethanol is allowed to stand at 20–23° C. for four days, 150 ml. of benzene is added and the mixture is evaporated on the steam bath. The residue is diluted to 300 ml. with ether and added to a stirred slurry of 6 g. of lithium aluminum hydride in 500 ml. of ether. The reaction mixture is stirred for an additional 20 minutes and decomposed with 6 ml. of water, 5 ml. of 20% sodium hydroxide, and 22 ml. of water in that order. The reaction mixture is filtered and the filtrate allowed to evaporate. The residue is recrystallized from benzene and petroleum ether, to give 4-o-methoxyphenyl-1-piperidinepropanal, M.P. 109–110° C.

*Example 2*

A mixture of 38.2 g. of 4-o-methoxyphenylpiperidine, 19.5 g. of ethyl 4-bromobutyrate and 200 ml. of benzene is stirred with refluxing for 16 hours. 150 ml. of benzene is removed by distillation and the residue is diluted to 600 ml. with ether and filtered. The filtrate is concentrated on the steam bath to about 200 ml. and slowly added to a stirred slurry of 6 g. of lithium aluminum hydride in 500 ml. of ether. The reaction mixture is stirred for an additional two hours and then decomposed with 6 ml. of water, 4 ml. of 20% sodium hydroxide and 22 ml. of water in that order. The reaction mixture is filtered and the filtrate evaporated. The residue is recrystallized from a mixture of benzene and petroleum ether to give 4-o-methoxyphenyl-1-piperidinebutanol M.P. 77–79° C.

*Example 3*

A solution of 13 g. of 4-o-methoxyphenylpiperidine and 3.5 g. of ethylene oxide in 25 ml. of 95% ethanol is allowed to stand for 16 hours in an ice bath. The reaction mixture is diluted with 200 ml. of absolute ethanol and evaporated on a steam bath. The residue is converted to the hydrochloride with isopropanolic hydrogen chloride and then recrystallized from a mixture of isopropanol and ether to give 4-o-methoxyphenyl-1-piperidineethanol monohydrochloride, M.P. 163–164.5° C.

*Example 4*

(a) A mixture of 30 g. of 4-o-methoxyphenylpiperidine, 16.5 g. of 5-bromopentanol-1, acetate ester and 150 ml. of benzene is stirred with refluxing for 18 hours. The reaction mixture is diluted to 500 ml. with dry ether and filtered. The filtrate is evaporated on the steam bath and the residue comprising 4-o-methoxyphenyl-1-piperidinepentanol, acetate ester, is dissolved in 400 ml. of methanol containing 2 g. of sodium methoxide. The reaction mixture is again evaporated and the residue diluted to 500 ml. with dry ether, washed with water, dried over anhydrous magnesium sulphate, filtered and evaporated from a steam bath. The residue is triturated with petroleum ether until crystalline and the crystals recrystallized from a mixture of ether and petroleum ether to give 4-o-methoxyphenyl-1-piperidinepentanol, M.P. 82–83° C. The product can be converted to the hydrobromide salt by treating with an excess of isopropanolic hydrogen bromide, diluting with ether, stirring and filtering. The resulting hydrobromide salt can be purified if desired by recrystallization from isopropanol-ether mixture.

(b) A mixture of 30 g. of 4-o-methoxyphenyl-1-piperidinepentanol, 11 g. of ethyl carbamate and 85 g. of toluene is heated to reflux temperature and 20 ml. of distillate is removed. Aluminum isopropoxide (2 g.) is added and the alcohol liberated in the reaction is removed by azeotropic distillation through a column (14-inch) over a period of about one hour. The residue is diluted with 500 ml. of benzene, shaken twice with hot water and filtered through diatomaceous earth. The benzene layer is decanted and concentrated to about 150 ml. by distillation. The concentrate is diluted with petroleum ether, chilled and filtered. The filter cake, consisting of 4-o-methoxyphenyl-1-piperidinepentanol carbamate ester, can be converted to the hydrochloride salt by the addition of one equivalent of isopropanolic hydrogen chloride, recovery of the resulting crystalline product and recrystallizing from isopropanol-ether mixture.

Example 5

A solution of 18 g. of 5-carbomethoxyvaleryl chloride in 300 ml. of benzene is added rapidly to a solution of 38.5 g. of 4-o-methoxyphenylpiperidine in 400 ml. of benzene with stirring. The reaction mixture is allowed to stand for 20 minutes, filtered and the filtrate concentrated to 75 ml. by distillation. The residue is diluted to 250 ml. with ether and slowly added to a stirred slurry of 12 g. of lithium aluminum hydride in 500 ml. of ether. This reaction mixture is stirred and refluxed for 1.5 hours after the addition and then decomposed with 12 ml. of water, 10 ml. of 20% sodium hydroxide and 44 ml. of water in that order. The mixture is filtered and the filtrate is evaporated on the steam bath. The residue is converted to the hydrochloride with isopropanolic hydrogen chloride and recrystallized from a mixture of isopropanol and ether to give 4-o-methoxyphenyl-1-piperidine hexanol monohydrochloride, M.P. 150-151° C.

Example 6

(a) A solution of 252 g. of o-bromophenetole in 350 ml. of ether is added rapidly to a stirred mixture of 17.5 g. of lithium ribbon in 500 ml. of ether with cooling. The mixture is stirred and refluxed for one hour after the addition then 189 g. of N-benzyl-4-piperidone in 250 ml. of ether is added. The reaction mixture is stirred for ½ hour and then decomposed by the cautious addition of 250 ml. of water. The ether layer is decanted and washed three times with 200 ml. of water. The ether layers are extracted with dilute hydrochloric acid. The acid extracts are combined, made basic and extracted again with ether. This ethereal solution is washed with water, dried over anhydrous magnesium sulfate, filtered and evaporated. 300 g. of the resulting N-benzyl-4-o-ethoxyphenyl-4-piperidol is dissolved in 350 ml. of acetic anhydride and heated to reflux. After about 30 minutes the solvents are removed by vacuum distillation and the residue is treated with crushed ice and water and then with an excess of dilute sodium hydroxide solution. The basic mixture is extracted with ether, the ether extracts washed, dried over anhydrous magnesium sulfate, filtered and evaporated. The residue is distilled in vacuo to give N-benzyl-4-o-ethoxyphenyl-1,2,5,6-tetrahydropyridine, B.P. 175-185 at 0.6 mm. 190 g. of N-benzyl-4-o-ethoxyphenyl-1,2,5,6-tetrahydropyridine in 500 ml. of acetic acid is reduced with hydrogen at four atmospheres and 5 g. of 5% palladium on charcoal catalyst. The catalyst is removed after the reduction by filtration, 70 ml. of concentrated hydrochloric acid is added and the mixture concentrated under reduced pressure until the residue solidifies. The residue is diluted with water and washed with ether. The aqueous layer is decanted, made basic with dilute sodium hydroxide solution, extracted with ether. The ethereal solution is washed with water, dried over anhydrous magnesium sulfate, filtered and evaporated. The residue is distilled in vacuo to give 4-o-ethoxyphenyl-piperidine, B.P. 118-120° C. at 1.3 mm.

(b) A mixture consisting of 30 g. of 4-o-ethoxyphenyl-piperidine, 14.5 g. of ethyl 4-bromobutyrate and 200 ml. of benzene is stirred and refluxed for 16 hours. Approximately 150 ml. of benzene is removed by distillation and the residue is diluted to 500 ml. with ether and filtered. The filtrate is concentrated to 250 ml. and added to a stirred slurry of 6 g. of lithium aluminum hydride in 500 ml. of ether. The reaction mixture is stirred for 30 minutes and then decomposed with 6 ml. of water, 4.5 ml. of 20% sodium hydroxide solution and 22 ml. of water in that order. The mixture is filtered and the filtrate evaporated on a steam bath. The residue is dissolved in isopropanol and treated with an excess of isopropanolic hydrogen chloride. The solution on dilution with ether gives a precipitate which is filtered and recrystallized from a mixture of isopropanol and ether to give 4-o-ethoxyphenyl - 1 - piperidinebutanol monohydrochloride, M.P. 134–136° C.

(c) A mixture of 30 g. of 4-o-ethoxyphenyl-1-piperidinebutanol, 11 g. of ethyl carbamate and 85 g. of toluene is heated to reflux temperatures and 20 ml. of distillate is removed for drying. 2 g. of aluminum isopropoxide is added and the alcohol liberated in the reaction is removed by azeotropic distillation through a distillation column (14-inch) over a period of about one hour. The residue is diluted with 500 ml. of benzene and shaken twice with hot water and filtered through diatomaceous earth. The benzene layer is decanted and concentrated to about 150 ml. by distillation, diluted with petroleum ether, chilled and filtered. The filter cake is 4-o-ethoxyphenyl-1-piperidinebutanol carbamate ester. This product may be converted to the monohydrochloride by the addition of one equivalent of isopropanolic hydrogen chloride and recrystallized from isopropanol-ether mixture.

In like manner, 4-o-ethoxyphenyl-1-piperidinepentanol carbamate ester and its hydrochloride salt can be prepared starting with 29 g. of 4-o-ethoxyphenyl-1-piperidinepentanol and 11 g. of ethyl carbamate.

Example 7

(a) A mixture consisting of 40 g. of 4-o-ethoxyphenylpiperidine, 20.5 g. of 5-bromopentanol-1, acetate ester and 200 ml. of benzene is stirred and refluxed for 16 hours. 150 ml. of benzene is removed by distillation and the residue is diluted to 600 ml. with ether and filtered. The filtrate is evaporated on the steam bath and the residue is dissolved in 400 ml. of methanol containing 2 g. of sodium methoxide and the solution again heated and evaporated. The residue is diluted with 600 ml. of ether, washed with water, dried over anhydrous magnesium sulfate, filtered and evaporated. The residue is converted to the hydrochloride with an excess of isopropanolic hydrogen chloride and recrystallized from a mixture of isopropanol and ether, to give 4-o-ethoxyphenyl-1-piperidinepentanol monohydrochloride, M.P. 151–152° C.

(b) A solution of 22 g. of 4-o-ethoxyphenyl-1-piperidinepentanol, 75 ml. of benzene and 7 g. of ethyl isocyanate is allowed to stand at room temperature (20–23° C.) for four days. The reaction mixture is evaporated on a steam bath, and the residue comprising 4-o-ethoxyphenyl-1-piperidinepentanol, N-ethyl carbamate ester is converted to the monohydrochloride with an equivalent of isopropanolic hydrogen chloride. This hydrochloride is recrystallized from a mixture of isopropanol and ether to yield 4-o-ethoxyphenyl-1-piperidinepentanol, N-ethyl carbamate ester monohydrochloride.

In like manner, 4-o-methoxyphenyl-1-piperidinepentanol, N-ethyl carbamate ester and its hydrochloride salt can be prepared starting with 21.5 g. of 4-o-methoxyphenyl-1-piperidinepentanol and 7 g. of ethyl isocyanate.

Example 8

A solution of 17.5 g. of 5-carbomethoxyvaleryl chloride in 50 ml. of benzene is added rapidly with stirring to a solution of 40 g. of 4-o-ethoxyphenylpiperidine in 300 ml. of benzene. After 20 minutes the reaction mixture is filtered and the filtrate is concentrated to approximately 100 ml. on a steam bath and then added dropwise to a stirred slurry of 10 g. of lithium aluminum hydride in 500 ml. of ether. The reaction mixture is stirred for two hours after the addition and then decomposed with 10.5 ml. of water, 8 ml. of 20% sodium hydroxide and 37 ml. of water in that order. The reaction mixture is filtered and the filtrate evaporated on the steam bath. The residual product, 4-o-ethoxyphenyl-1-piperidinehexanol, is converted to the hydrochloride by the addition of isopropanolic hydrogen chloride and the precipitate recrystallized from a mixture of isopropanol and ether. The resulting salt, 4-o-ethoxyphenyl-1-piperidinehexanol monohydrochloride, has a melting point of 139–140° C.

*Example 9*

(a) A mixture of 450 g. of o-chlorobenzaldehyde, 735 g. of ethyl cyanoacetate and 500 ml. of absolute alcohol is treated with 15 ml. of piperidine. The reaction is allowed to stand for 24 hours and chilled and filtered. The precipitate is washed with a 50% dilute alcohol until the yellow color has vanished. The precipitate is dissolved in a mixture consisting of one liter of acetic acid, one liter of water and one liter of concentrated hydrochloric acid. The reaction mixture is refluxed for 72 hours after which time part of the solvent is removed by distillation. The residue is cooled, filtered and the filter cake dissolved in 6 liters of water containing 270 g. of sodium hydroxide, boiled, charcoaled, filtered and then treated with concentrated hydrochloric acid until very acid. The product is removed by filtration, washed with water and dried in vacuo. The product is β-o-chlorophenylglutaric acid, M.P. 173–178° C. A mixture consisting of 385 g. of β-o-chlorophenylglutaric acid and 226 ml. of concentrated ammonia is heated in an open flask until a temperature of 225° C. is reached. The residue is poured onto ice, removed by filtration and dissolved in chloroform. The chloroform solution is washed with sodium bicarbonate solution and water and the chloroform is removed by evaporation to give a residue which is recrystallized from ethanol to give β-o-chlorophenylglutarimide, M.P. 169–172° C. A solution of 214 g. of β-o-chlorophenylglutarimide in 1.5 l. of p-dioxane is added dropwise with stirring to 100 g. of lithium aluminum hydride, in 6.4 l. of anhydrous ether. The reaction mixture is refluxed with stirring for eight hours and then decomposed with 105 ml. of water dropwise, 79 ml. of 20% sodium hydroxide solution and 368 ml. of water in that order. The ethereal solution is evaporated to dryness and the residue distilled in vacuo to give 4-o-chlorophenylpiperidine, B.P. 94–98° C. at 0.4 mm.

(b) A mixture consisting of 39 g. of 4-o-chlorophenylpiperidine, 19.5 g. of ethyl 4-bromobutyrate and 200 ml. of benzene is stirred at reflux temperature for 16 hours. Approximately 150 ml. of benzene is removed by distillation and the residue diluted to 600 ml. with ether, stirred and filtered. The filtrate is concentrated to approximately 100 ml. and added slowly to a stirred slurry of 7.6 g. of lithium aluminum hydride in 500 ml. of ether. The reaction mixture is allowed to stand for 15 minutes and then is decomposed with 8 ml. of water, 6 ml. of 20% sodium hydroxide solution and 28 ml. of water in that order. The ether solution is filtered and the filtrate evaporated on a steam bath. The residue is treated with isopropanolic hydrogen chloride which on dilution with ether gives a precipitate that is recrystallyzed from isopropanol and ether to give 4-o-chlorophenyl-1-piperidinebutanol monohydrochloride, M.P. 163.5–165° C.

A solution of 18 g. of 5-carbomethoxyvaleryl chloride in 75 ml. of benzene is added to a solution of 39 g. of 4-o-chlorophenylpiperidine in 350 ml. of benzene. The reaction mixture is stirred well and allowed to stand for one hour, diluted with an equal volume of ether and filtered. The filtrate is concentrated to approximately 100 ml. and added to a stirred slurry of 12 g. of lithium aluminum hydride and one liter of ether. The reaction mixture is stirred and refluxed for three hours and then decomposed with 12.5 ml. of water, 9.5 ml. of 20% sodium hydroxide solution and 44 ml. of water, in that order. The reaction mixture is filtered and the filtrate evaporated on the steam bath. The residual free base, 4-o-chlorophenyl-1-piperidinehexanol, is treated with isopropanolic hydrogen chloride, diluted with ether and filtered. The precipitate is recrystallized from the mixture of isopropanol and ether to give 4-o-chlorophenyl-1-piperidinehexanol monohydrochloride M.P. 130–133° C.

*Example 11*

A mixture of 30.5 g. of 4-o-chlorophenylpiperidine, 16.3 g. of 5-bromopentanol-1, acetate ester and 40 ml. of benzene is allowed to stand at 18–22° C. for 10 days. The reaction mixture is diluted to 600 ml. with ether, stirred well and filtered. The filtrate is evaporated on a steam bath and the residue containing 4-o-chlorophenyl-1-piperidinepentanol, acetate ester, is dissolved in 500 ml. of methanol containing 2 g. of sodium methoxide, and again evaporated. The residue is diluted to 600 ml. with ether, washed three times with 200 ml. of water, dried over anhydrous magnesium sulfate, filtered and evaporated. The residue is converted to the hydrochloride with isopropanolic hydrogen chloride, recrystallized from a mixture of isopropanol and ether to give 4-o-chlorophenyl-1-piperidinepentanol monohydrochloride, M.P. 146–147° C.

*Example 12*

(a) A mixture of 25 g. of o-methylthiobenzaldehyde and 44 g. of ethyl acetoacetate is treated at 0° C. with two ml. of piperidine, allowed to stand at 0–5° C. for one hour and then at 20–25° C. for 24 hours. 25 ml. of absolute ethanol is added and the reaction mixture is chilled, filtered and the precipitate washed with 50% dilute alcohol. This precipitate is partially dried and then added portionwise to a stirred hot solution of 35 g. of potassium hydroxide in 25 ml. of water. The reaction mixture is stirred and maintained at 90–95° C. for 45 minutes, diluted with two volumes of water, washed with ether, acidified slowly with 55 ml. of concentrated hydrochloric acid, chilled thoroughly and filtered. The filter cake is washed several times with ice water and dried in vacuo at 60° C. The product is β-o-methylthiophenylglutaric acid. 15 g. of β-o-methylthiophenylglutaric acid is dissolved in 50 ml. of water and 15 ml. of concentrated ammonium hydroxide. This mixture is heated in an open flask until the temperature reaches 200–220° C. The mixture is then cooled and diluted with 25 ml. of absolute ethanol, heated to boiling, diluted with 40 ml. of hot water, stirred, cooled thoroughly and filtered. The filter cake is washed with ice water and dried. 20 g. of the product, β-o-methylthiophenylglutarimide, is dissolved in 100 ml. of anhydrous dioxane and slowly added to a stirred slurry of 9.5 g. of lithium aluminum hydried in 300 ml. of ether. The reaction mixture is stirred for an additional two hours after the addition and then decomposed with 10 ml. of water, 7.5 ml. of 20% sodium hydroxide solution and 32 ml. of water in that order. The reaction mixture is filtered, the solvent is removed by evaporation on a steam bath, and the residue is distilled in vacuo. The product is 4-o-methylthiophenylpiperidine.

(b) A mixture of 32.3 g. of 4-o-methylthiophenylpiperidine, 16.3 g. of 5-bromopentanol-1, acetate ester and 40 ml. of benzene is allowed to stand at room temperature for 10 days. The reaction mixture is diluted to 600 ml. with ether, stirred and filtered. The filtrate is evaporated on a steam bath and the residue containing 4-o-methylthiophenyl-1-piperidinepentanol, acetate ester, is dissolved in 500 ml. of methanol containing 2 g. of sodium methoxide and evaporated. The residue is diluted with ether, washed with water (200 ml.), dried over magnesium sulfate, filtered and evaporated. The residue containing the free base 4-o-methylthiophenyl-1-piperidinepentanol can be converted to the hydrochloride by treating with one equivalent of hydrogen chloride in isopropanol and recrystallizing the resulting precipitate from isopropanol-ether mixture.

*Example 13*

(a) A mixture of 50 g. of o-bromobenzaldehyde, 75 g. of ethylcyanoacetate and 75 ml. of absolute alcohol is treated with 2 ml. of piperidine. Reaction is allowed to stand for 24 hours and chilled and filtered. The precipitate is washed with 50% dilute alcohol until the yellow color has vanished. The precipitate is dissolved in a mixture of 100 ml. of acetic acid, 100 ml. of water and 100 ml. of concentrated hydrochloric acid. Reaction mixture is refluxed for 72 hours after which time part of the solvent is removed by distillation. The residue is cooled, filtered and the filter cake dissolved in 600 ml. of water containing 80 g. of sodium hydroxide, boiled, charcoaled, filtered and then treated with concentrated hydrochloric acid until very acid. The product, $\beta$-o-bromophenylglutaric acid, is removed by filtration, washed with water and dried in vacuo. 16 g. of $\beta$-o-bromophenylglutaric acid is dissolved in 35 ml. of water and 15 ml. of concentrated ammonium hydroxide. The reaction mixture is heated to 180–200° C. and then cautiously diluted with 50 ml. of absolute alcohol, heated to boiling, diluted with 50 ml. of hot water, stirred, cooled thoroughly and filtered. The filter cake is washed with ice water and dried in vacuo at 60° C. 22 g. of the product, $\beta$-o-bromophenylglutarimide, is dissolved in 100 ml. of anhydrous p-dioxane and slowly added to a stirred slurry of 9.5 g. of lithium aluminum hydride in 500 ml. of ether. The reaction mixture is stirred for an additional two hours after the addition and then decomposed with 10 ml. of water, 7.5 ml. of 20% sodium hydroxide solution and 32 ml. of water in that order. The reaction mixture is filtered and the solvent removed by evaporation on a steam bath. The residual product, 4-o-bromophenylpiperidine, is purified by distillation in vacuo.

(b) A solution of 16.3 g. of 4-o-bromophenylpiperidine and 3.5 g. of ethylene oxide in 25 ml. of 95% ethanol is allowed to stand for 16 hours at ice bath temperature. The reaction mixture is diluted with 200 ml. of absolute ethanol and concontrated by evaporation at steam bath temperature. The product, 4-o-bromophenyl-1-piperidineethanol is converted to hydrochloride salt by treatment with one equivalent of hydrogen chloride gas dissolved in isopropanol. The crystalline 4-o-bromophenyl-1-piperidineethanol hydrochloride salt is collected and purified by recrystallization from isopropanol-ether mixture.

*Example 14*

(a) A mixture of 246 g. of o-allyloxybenzaldehyde and 436 g. of ethyl acetoacetate is treated at 0° C. with 15 ml. of piperidine, allowed to stand at 0–5° C. for one hour and then at 20–25° C. for 24 hours. 200 ml. of absolute ethanol is added. The reaction mixture is chilled thoroughly and filtered. The precipitate is washed with a 50% dilute alcohol until the yellow color has vanished. This precipitate is partially dried and then added portionwise to a stirred hot solution of 350 g. of potassium hydroxide in 240 ml. of water. The reaction mixture is stirred and maintained at 90–95° C. for 45 minutes, diluted with two volumes of water, washed with ether, acidified slowly with 550 ml. of concentrated hydrochloric acid, chilled thoroughly and filtered. The filter cake consisting of $\beta$-o-allyloxyphenylglutaric acid is washed several times with ice water and dried in vacuo at 60° C. The product (150 g.) is dissolved in 300 ml. of water and 100 ml. of concentrated ammonium hydroxide. The solution is charcoaled and filtered and then heated in an open flask until the temperature of the mixture reaches 200° C. This temperature is maintained for approximately 20 minutes and then cautiously diluted with 200 ml. of absolute alcohol, heated to boiling, diluted with 400 ml. of hot water, stirred, cooled thoroughly and filtered. The filter cake, $\beta$-o-allyloxyphenylglutarimide, is washed with ice water and dried in vacuo at 60° C. The product (231 g.) is dissolved in 700 ml. of anhydrous tetrahydrofuran and the solution slowly added (2.5 hours) to a stirred slurry of 93 g. of lithium aluminum hydride in 3 liters of ether. The reaction mixture is stirred for an additional two hours after the addition and then decomposed with 98 ml. of water, 73 ml. of 20% sodium hydroxide and 318 ml. of water in that order. The reaction mixture is filtered and the solvent removed by evaporation on a steam bath. The residual product, 4-o-allyloxyphenylpiperidine, is purified by distillation in vacuo.

(b) A mixture of 39.6 g. of 4-o-allyloxyphenylpiperidine, 20.5 g. of 5-bromopentanol-1, acetate ester and 200 ml. of benzene is stirred and refluxed for 16 hours. Benzene (150 ml.) is removed by distillation and the residue is diluted to 600 ml. with ether and filtered. The filtrate is concentrated at steam bath temperature and the residue containing 4-o-allyloxyphenylpiperidine pentanol, acetate ester, of methanol containing 2 g. of sodium methoxide. The solution is concentrated in a steam bath, the residue is diluted with 600 ml. of ether, washed with water, dried over anhydrous magnesium sulfate, filtered and concentrated by evaporation. The residual product, 4-o-allyloxyphenylpiperidinepentanol, is converted to the hydrochloride salt with an excess of isopropanolic hydrogen chloride and recrystallized from a mixture of isopropanol and ether. The product is 4-o-allyloxyphenylpiperidinepentanol, hydrochloride.

*Example 15*

A mixture of 26.4 g. of 4-o-methoxyphenylpiperidinepentanol and 110 g. of N,N-dimethylcarbamyl chloride in 100 ml. of chlorobenzene is heated at reflux temperature for two hours. The reaction mixture is allowed to cool, 300 ml. of ether is added and the resulting precipitate is collected by filtration and purified by recrystallization from isopropanol-ether mixture. The product is 4-o-methoxyphenylpiperidinepentanol N,N-dimethylcarbamate ester in hydrochloride salt form.

The starting materials for the production of the products of the invention can be prepared by the methods of which specific embodiments are set forth in the foregoing examples. Thus, the o-substituted phenylpiperidines can be prepared by the reduction of the corresponding o-substituted-$\beta$-phenylglutarimides. These latter compounds are prepared by condensing an o-substituted benzaldehyde with an ester of acetoacetic acid or cyanoacetic acid and decomposing the resulting condensate. Likewise, the N-omega-hydroxyalkyl $\beta$-phenylglutarimide can be prepared by condensing the appropriate o-substituted $\beta$-phenylglutaric acid with an excess of hydroxyalkylamine, at elevated temperature.

I claim:

1. A member of the class consisting of 4-phenyl-1-substituted piperidines and non-toxic acid addition salts thereof having in free base form the formula

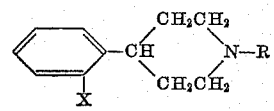

wherein X is a member of the class consisting of chlorine and bromine radicals and alkoxy, alkenyloxy and alkylmercapto groups containing from one to three carbon atoms and R is a member of the class consisting of hydroxyalkyl groups containing from two to six carbon atoms and carboxylic acid acyl containing not more than four carbon atoms, carbamic acid and N(lower alkyl)- and N,N-di(lower alkyl)-carbamic acid ester derivatives thereof.

2. 4-o-methoxyphenyl-1-piperidinepentanol in non-toxic acid addition salt form.

3. 4-o-ethoxyphenyl-1-piperidinepentanol in non-toxic acid addition salt form.

4. 4-o-methoxyphenyl-1-piperidinepentanol, N-ethyl carbamate ester in non-toxic acid addition salt form.

5. 4-o-ethoxyphenyl-1-piperidinepentanol, N-ethyl carbamate ester in non-toxic acid addition salt form.

6. 4-o-methoxyphenyl-1-piperidinepentanol, carbamate ester in non-toxic acid addition salt form.

7. 4-o-ethoxyphenyl-1-piperidinepentanol, carbamate ester in non-toxic acid addition salt form.

No references cited.